G. L. Jones,
Bread-Cutter,
No. 77,383. Patented Apr. 28, 1868.
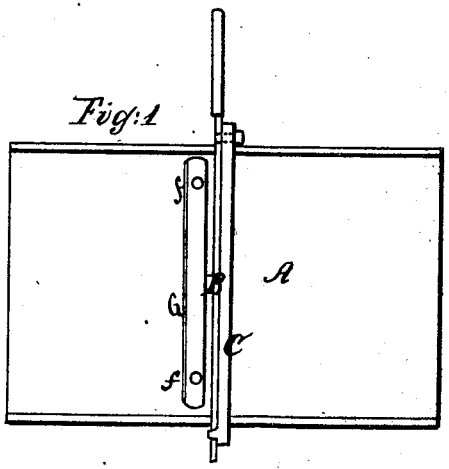
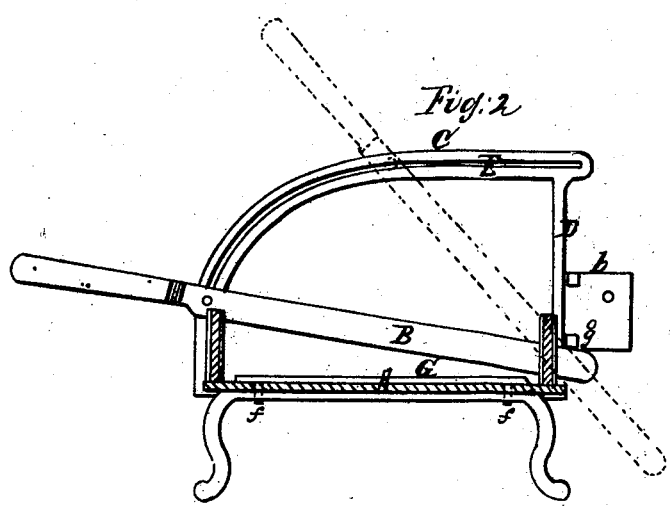
Witnesses
Inventor
George L. Jones
by his attys
Gardner & Hyde

United States Patent Office.

GEORGE L. JONES, OF CHICOPEE, MASSACHUSETTS.

Letters Patent No. 77,383, dated April 28, 1868.

IMPROVED BREAD-CUTTER.

The Schedule referred to in these Letters Patent and making part of the same.

TO ALL WHOM IT MAY CONCERN:

Be it known that I, GEORGE L. JONES, of Chicopee, Hampden county, Commonwealth of Massachusetts, have invented a new and useful Improved Bread and Cake-Slicer; and I do hereby declare that the following is a full and clear description thereof, reference being had to the accompanying drawings, and to the letters of reference marked thereon. In the drawings—

Figure 1 is a plan view, and

Figure 2 an end view of my device.

This invention consists of a device for cutting and slicing cake, bread, &c., and is so arranged that a positive saw-motion is given to the knife, so that the certainty of cutting evenly and easily is produced.

In the drawings, it is seen that the cutting-device is arranged at or near the middle of the trough A, and that the knife B is guided by an eccentric-guide, C, turning up from one side of the trough, and crossing above it. A connecting-piece, D, is made between the upper end of the guide C and the side of the trough A, beneath it. Upon this vertical piece D are holes for screws, $a$ and $b$, under which the end of the knife works. There are two or more of these projecting screws $a$ and $b$, one, $b$, a little above the other, for reasons I will hereafter explain. The knife is arranged at or near the haft, so that it is guided at this point by the slot E in the guide-piece C. The manner in which I prefer to arrange it is by means of a bolt attached to the knife, and passed through the slot, and headed on the other side.

I use the projecting screw $b$ to act as a fulcrum for the knife, when a device is inserted in the trough beneath the knife requiring the plane to be elevated. The projecting screw $a$ acts as a fulcrum for the back of the knife in its ordinary arrangement.

An adjustable gauge for the bread can be made by placing a strip of wood, G, immediately in front of the knife. This strip has pins, $f$, set underneath it, which fit into corresponding holes in the bottom of the trough. As the pins $f$ are not set in the piece G at equal distances from the side edges, by turning the strip half around and resetting it, a different distance of the edge next to the knife is obtained relatively to the latter.

The advantage I obtain by this device is that the knife is given a positive motion, aside from the regular one obtained by the operation of it upon an axis at one end, thus producing a saw-cut, which is peculiarly requisite in cutting fresh bread or cake; and the trough on each side of the knife catches the slices.

Now, having described my invention, what I claim as new, and desire to secure by Letters Patent, is—

1. The combination of the knife B, having its end free, with the eccentric-guide C and projecting plate D, substantially as and for the purpose described.

2. In combination with the device above claimed, the reversible gauge, consisting of the piece G and pins $f$, arranged as described.

GEO. L. JONES.

Witnesses:
J. B. GARDINER,
E. H. HYDE.